(12) United States Patent
Kunihiro

(10) Patent No.: US 8,248,657 B2
(45) Date of Patent: Aug. 21, 2012

(54) PRINTING APPARATUS

(75) Inventor: Syunichi Kunihiro, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 12/489,920

(22) Filed: Jun. 23, 2009

(65) Prior Publication Data
US 2010/0002245 A1 Jan. 7, 2010

(30) Foreign Application Priority Data
Jul. 1, 2008 (JP) .................................. 2008-172647

(51) Int. Cl.
*G06F 3/12* (2006.01)
(52) U.S. Cl. ...................... 358/1.8; 358/1.9; 358/1.13
(58) Field of Classification Search .................. 358/1.8, 358/1.9, 1.13
See application file for complete search history.

(56) References Cited

U.S. PATENT DOCUMENTS

| 5,663,750 | A   | * | 9/1997  | Sakuma .............................. 347/7 |
| 5,721,578 | A   |   | 2/1998  | Nakai et al. |
| 5,829,893 | A   | * | 11/1998 | Kinoshita et al. ................ 400/88 |
| 6,671,069 | B1  | * | 12/2003 | Kurosawa et al. .............. 358/1.9 |
| 2005/0024407 | A1 | * | 2/2005 | Kawatoko et al. .............. 347/15 |
| 2007/0165054 | A1 | * | 7/2007 | Shimoji ........................... 347/14 |
| 2007/0236526 | A1 | * | 10/2007 | Noguchi et al. ................ 347/15 |
| 2008/0174823 | A1 | * | 7/2008 | Yaguchi ....................... 358/1.16 |

FOREIGN PATENT DOCUMENTS

JP  8-20125  1/1996

* cited by examiner

*Primary Examiner* — Twyler Haskins
*Assistant Examiner* — Helen Q Zong
(74) *Attorney, Agent, or Firm* — Fitzpatrick, Cella, Harper & Scinto

(57) ABSTRACT

This invention is directed to a printing apparatus capable of simplifying the apparatus arrangement by using a common processing unit to execute different processes. To achieve this, a common processing unit is adopted to execute the first processing to perform multi-value/binary conversion of multi-valued data and the second processing to perform resolution conversion and thinning processing of binary data. In accordance with an instruction input from a user, it is controlled to execute either the first or second processing. An image is printed on a printing medium based on data obtained by executing the common processing unit.

5 Claims, 9 Drawing Sheets

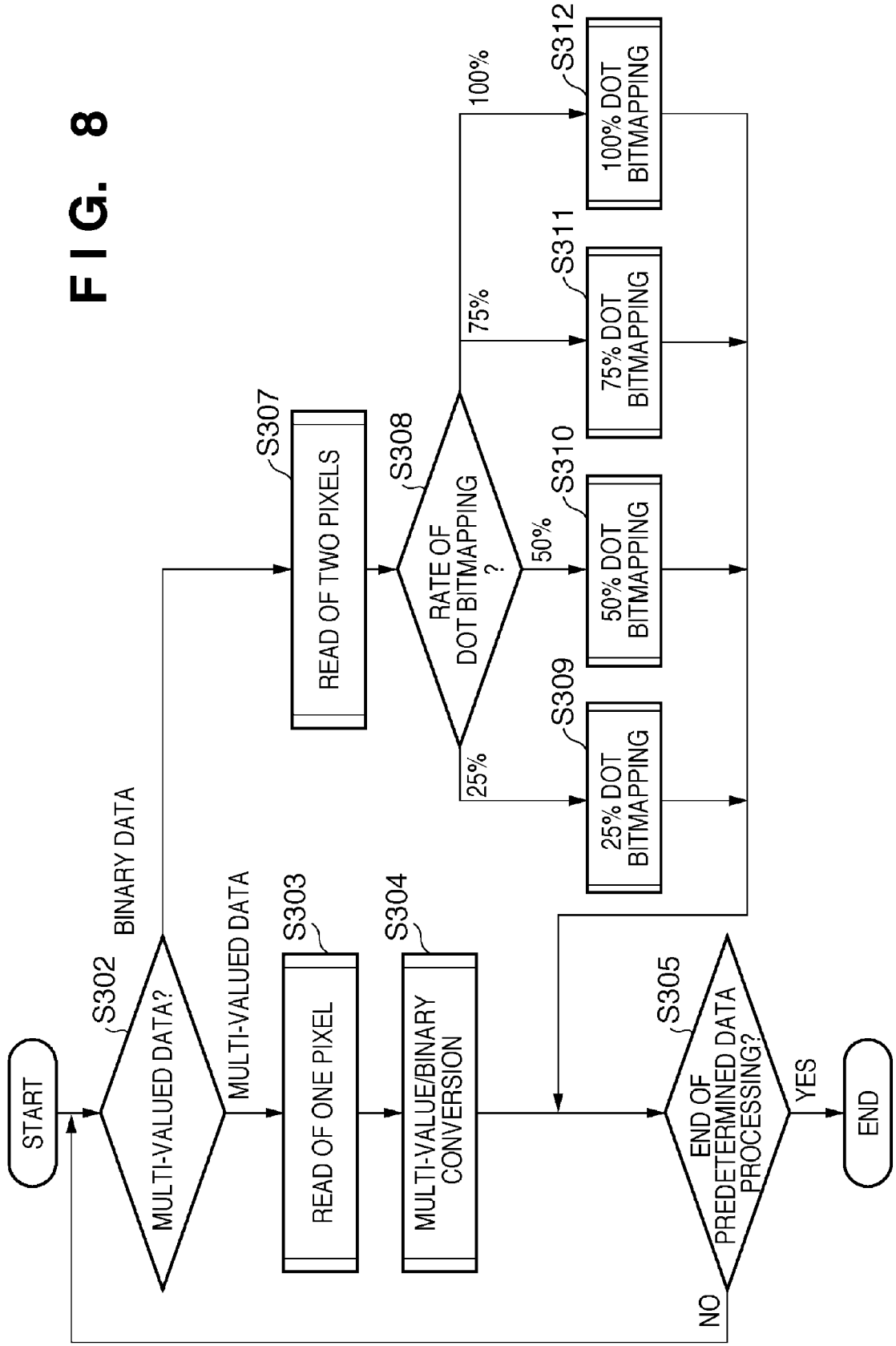

FIG. 9A
MULTI-VALUED DATA 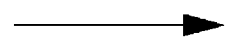 BINARY DATA
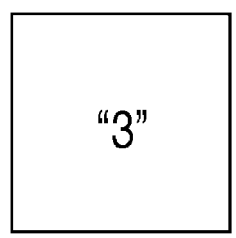 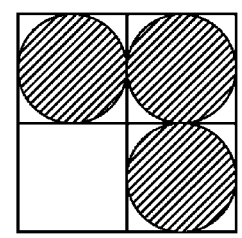
901
FIG. 9B
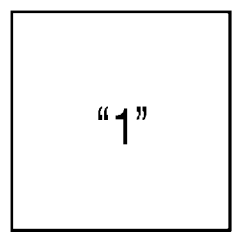  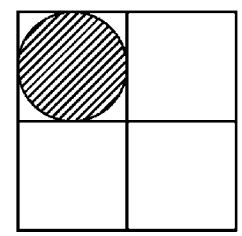
902
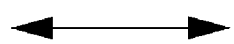 
300-dpi GRID      600-dpi GRIDS

PRINTING APPARATUS

BACKGROUND OF THE INVENTION

1. Field of the Invention

The present invention relates to a printing apparatus. Particularly, the present invention relates to a printing apparatus which prints by converting input print data.

2. Description of the Related Art

Recent printing apparatuses using printheads are available not only as a single-function printer which prints based on print data transferred from a host apparatus, but also as a multi-function printer (MFP) having scanner and copy functions.

In order to provide many functions, a multi-function printer includes a larger number of components and has a more complicated structure, compared to a single-function printer. Such multi-function printers particularly require various kinds of interfaces because their print data supply source ranges from a host apparatus to a scanner unit and memory card. However, a single printing unit prints using print data from a variety of supply sources. The multi-function printer needs to appropriately perform image processing for print data from a plurality of print data supply sources to supply print data to a printhead serving as a final printing means.

For example, when performing trial print of an image document read by the scanner unit of a multi-function printer, the multi-function printer thins image data from the scanner unit to generate print data. This thinning processing uses mask data (mask pattern). The thinning processing generally adopts a simple mask pattern, like zigzag thinning (see, e.g., Japanese Patent Laid-Open No. 8-20125). The thinning processing uses a plurality of mask patterns in accordance with the thinning rate.

Thinning processing using mask data (mask pattern) is also applied to so-called multi-pass printing to print a high-quality image. In this case, every time the printhead is scanned, the mask pattern is changed to use a different one.

Many different mask patterns are necessary to implement various functions of multi-function printers, and require a storage area for holding mask pattern data in the printer. Mask processing needs a large buffer area for bitmapping a mask pattern.

For this reason, multi-function printers suffer a large memory capacity to store a mask pattern. In addition, separate image processes each using a mask pattern increase the size of a data processing circuit such as an ASIC.

SUMMARY OF THE INVENTION

Accordingly, the present invention is conceived as a response to the above-described disadvantages of the conventional art.

For example, a printing apparatus according to this invention is capable of simplifying the apparatus arrangement by using a common processing means to execute different processes.

According to one aspect of the present invention, there is provided a printing apparatus comprising: instruction means for inputting an instruction from a user; data processing means for executing first processing to perform multi-value/binary conversion of multi-valued data and second processing to perform resolution conversion and thinning processing of binary data; control means for controlling to execute either of the first processing and the second processing in accordance with the instruction from the instruction means; and printing means for printing an image on a printing medium based on data obtained by executing the data processing means.

The invention is particularly advantageous since a common means is used as a means for executing processing of converting multi-valued data into binary data and a means for executing resolution conversion and thinning processing of the binary data. The apparatus arrangement can be simplified to suppress increases in the number of circuits, memory capacity, and the like.

Further features of the present invention will become apparent from the following description of exemplary embodiments with reference to the attached drawings.

BRIEF DESCRIPTION OF THE DRAWINGS

FIG. 8 is a flowchart showing details of density conversion processing (conversion processing).

FIGS. 9A and 9B are views showing multi-valued data dot bitmapping by multi-value/binary conversion.

DESCRIPTION OF THE EMBODIMENT

An exemplary embodiment of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Figure 1:
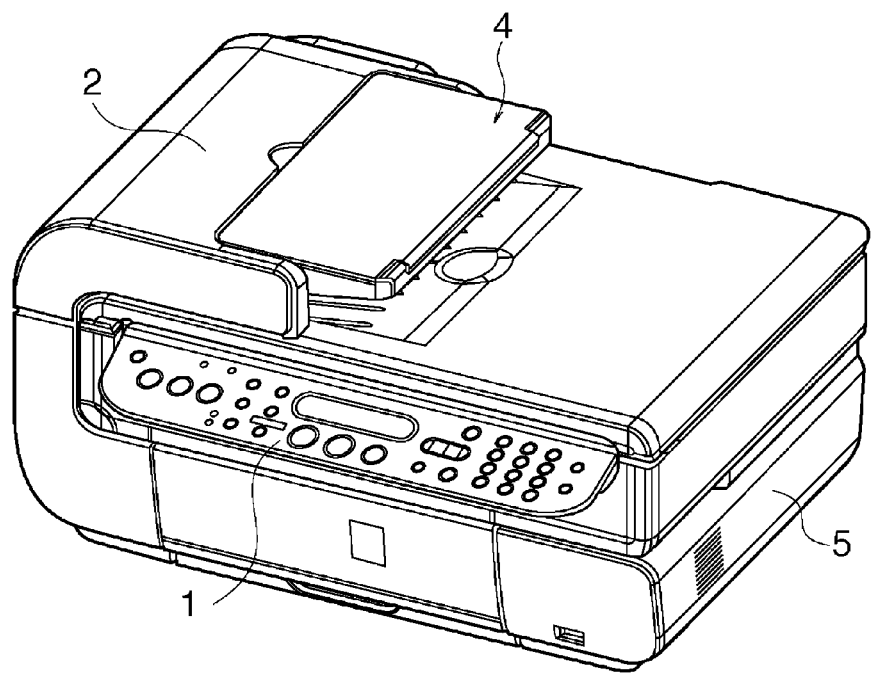
FIG. 1 is a perspective view showing the exterior of a multi-function printer (MFP) as a typical embodiment of the present invention.

FIG. 1 is a perspective view showing the exterior of a multi-function printer (MFP) as a typical embodiment of the present invention.

Referring to FIG. 1, the MFP includes an operation panel 1, image reading (scanner) unit 2, auto document feeder (ADF) 4, and printing unit 5 having an inkjet printhead (to be referred to as a printhead).

The operation panel 1 provides a start key, stop key, selection key, mode key, and the like. The user operates the operation panel 1 to designate the type of scan image such as a text or photo and the reading resolution, and set an ink saving (economy) mode from a plurality of print modes. In the ink saving (economy) mode, the ink consumption can be suppressed.

For example, the ink saving (economy) mode includes a mode in which data are thinned by 75%, a mode in which they are thinned by 50%, and a mode in which they are thinned by 25%. The user operates the operation panel 1 to set a thinning rate. At this setting, print data is thinned. This mode is applied to print, for example, a text image read by the image reading unit 2.

Figure 2:
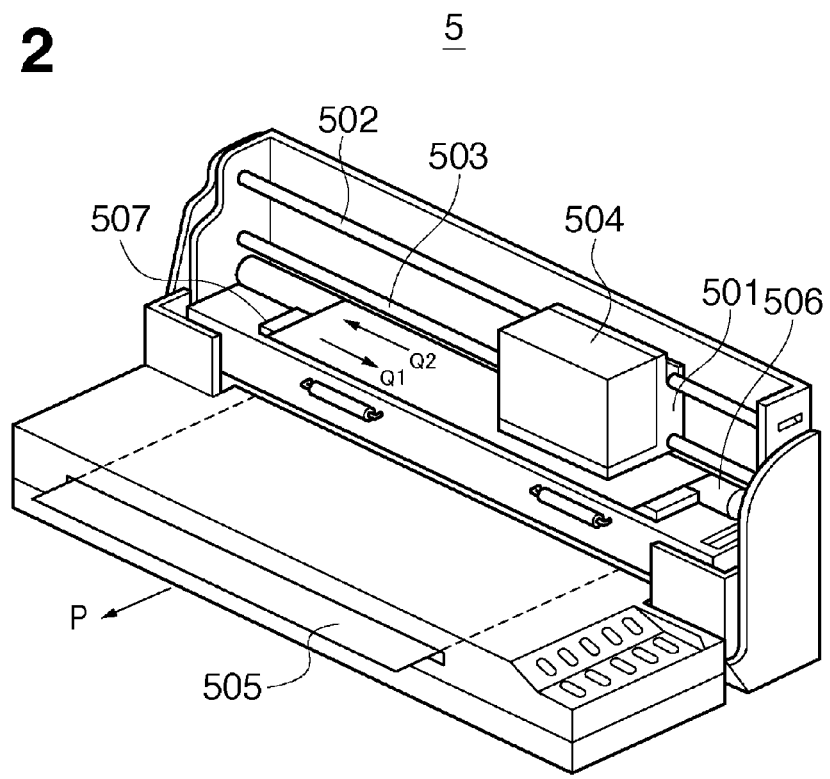
FIG. 2 is a perspective view showing the schematic arrangement of a printing unit 5 of the MFP.

FIG. 2 is a perspective view showing the schematic arrangement of the printing unit 5 of the MFP.

A printhead 504 mounted in a carriage 501 includes orifices (nozzles) capable of discharging ink, and is connected to an ink tank which stores ink. The orifices are formed in the lower surface of the printhead 504 in FIG. 2. The printhead 504 is mounted in the carriage 501 with its orifices facing down to print by discharging ink onto a printing medium 505 on a platen 507.

The carriage 501 is supported by two guide shafts 502 and 503 to be movable along them. The carriage 501 is driven by a carriage motor (not shown) to reciprocally scan a scan region including a print region in directions (main scanning direction) indicated by arrows Q1 and Q2. When the carriage 501 ends one main scanning, a conveyance roller 506 conveys the printing medium 505 by a predetermined amount (distance corresponding to the print width of the printhead 504) in the direction (sub-scanning direction) of an arrow P. The scanning of the printhead and the conveyance of a printing medium are repeated to print one page of the printing medium.

The printhead 504 of the printing unit 5 in the embodiment can print an image at a resolution of 600 dpi.

Figure 3:
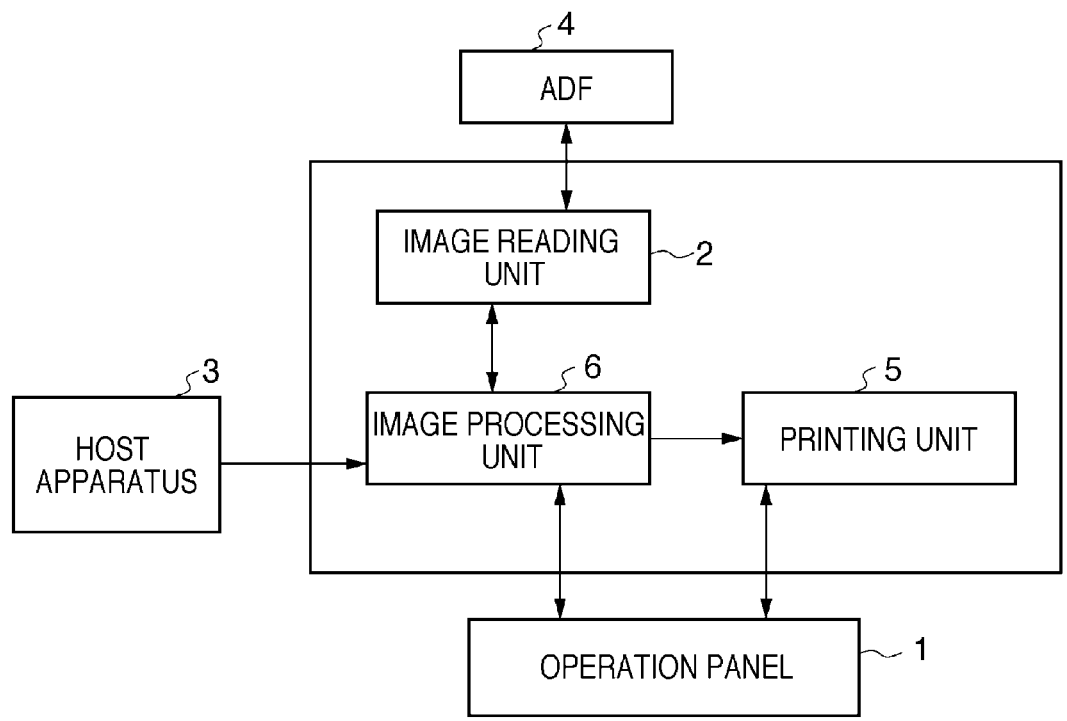
FIG. 3 is a block diagram showing the functional arrangement of the MFP.

FIG. 3 is a block diagram showing the functional arrangement of the MFP.

As shown in FIG. 3, the MFP functionally includes the image reading unit 2 for reading a document, the printing unit 5, and an image processing unit 6 which has an interface to a host apparatus 3 and receives image data from the host apparatus 3 or image reading unit 2 to perform image processing. The image processing unit 6 and printing unit 5 are connected by a serial (USB) interface.

The operation panel 1 is connected to the printing unit 5 and image processing unit 6 to accept various kinds of input instructions from the user. The image reading unit 2 is mechanically connected to the ADF 4 shown in FIG. 1.

The MFP can perform a copy operation to read an image document fed by the ADF 4 and print the image on a printing sheet by the printing unit 5. The MFP can also receive image data from the host apparatus 3 to print the image on a printing sheet by the printing unit 5. Further, the MFP can transfer, to the host apparatus 3, image data obtained by reading an image document.

The image reading unit 2 transfers, to the image processing unit 6, image data obtained by reading an image document. When the image document is a text image (designated as the image type), the image processing unit 6 performs image processing to generate 300-dpi binary data. The image processing unit 6 transfers the binary data to the printing unit 5. The printing unit 5 converts the received binary data into 600-dpi binary data in accordance with the print resolution of the printhead 504.

When the image document is a natural image such as a photograph, the image processing unit 6 performs image processing to generate multi-valued data quantized to represent each pixel of each 300-dpi color component by 2 bits. The image processing unit 6 outputs the multi-valued data to the printing unit 5. The printing unit 5 converts the received multi-valued data into 600-dpi binary data in accordance with the print resolution of the printhead 504.

Upon receiving image data from the host apparatus 3, the image processing unit 6 executes image processing such as brightness-density conversion, and transfers the resultant image data to the printing unit 5. If the image data from the host apparatus is text image data, the image processing unit 6 performs image processing to output 300-dpi binary data to the printing unit 5. If the image data from the host apparatus is color image data, the image processing unit 6 performs image processing to output, to the printing unit 5, multi-valued data quantized to represent each pixel of each 300-dpi color component by 2 bits.

Conversion processes for binary data and multi-valued data will be explained in detail later. Note that data processing is common to respective color components, so the color components will not be explained and will be simply referred to as multi-valued data.

The MFP performs control using two CPUs. One CPU controls the image reading unit 2 and image processing unit 6, and the other controls the printing unit 5.

Figure 4:
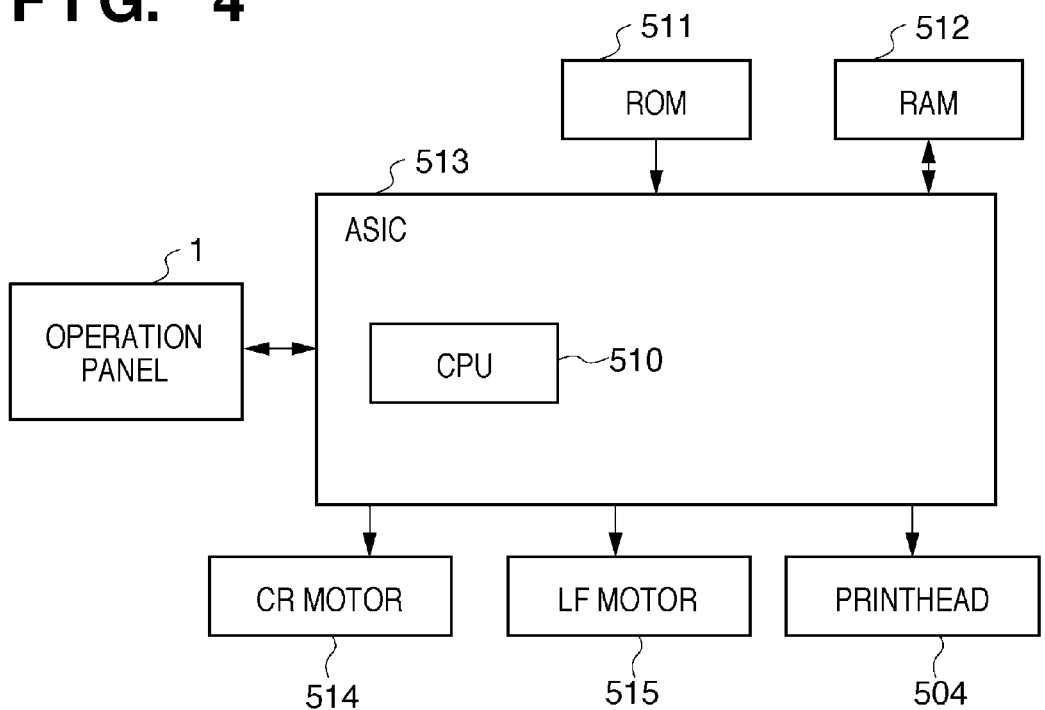
FIG. 4 is a block diagram showing the control arrangement of the printing unit 5.

FIG. 4 is a block diagram showing the control arrangement of the printing unit 5.

An ASIC 513 is a 1-chip integrated circuit equipped with a CPU 510. The ASIC 513 performs control based on a signal from the operation panel 1. The ASIC 513 includes a converter (to be described later), a motor driver, and a driver for the printhead 504. The motor driver controls a carriage (CR) motor 514 serving as the driving source of the carriage 501, and an LF motor 515 serving as the driving source of the conveyance roller.

A ROM 511 stores a control program for executing processing to be described later. A RAM 512 provides a work area used to execute a control program by the CPU 510, and an input buffer and print buffer to be described later.

Similar to the printing unit 5, the image processing unit 6 also includes a CPU and memories (ROM and RAM). The CPU of the image processing unit 6 executes image processing, control of the image reading unit, and communication control with the host apparatus 3. However, these processes are irrelevant to the present invention, and a description thereof will be omitted.

Note that the ASIC incorporates a CPU in the arrangement shown in FIG. 4, but the CPU may also be arranged outside the ASIC.

Figure 5:
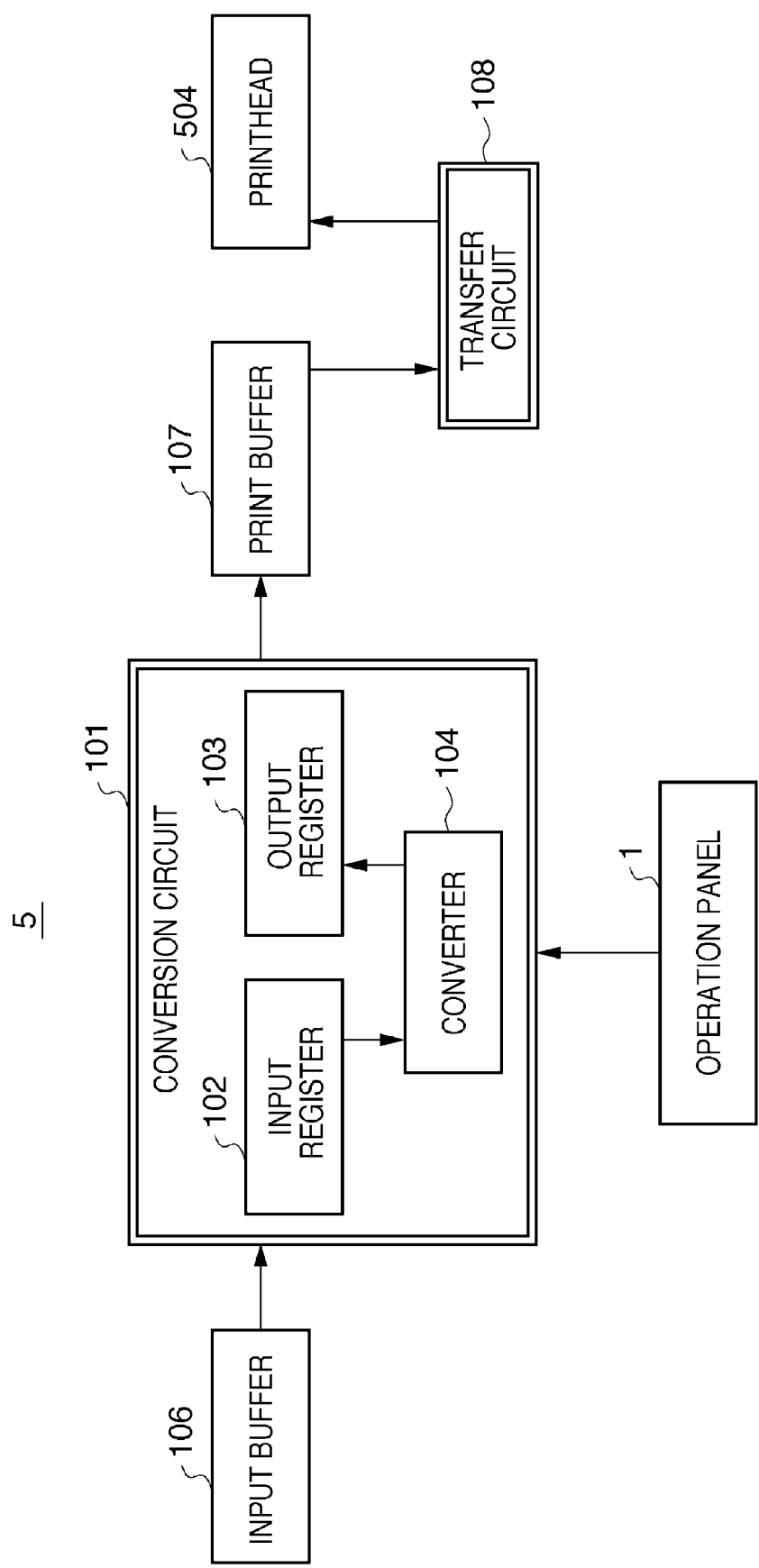
FIG. 5 is a block diagram showing the functional arrangement of the printing unit 5.

FIG. 5 is a block diagram showing the functional arrangement of the printing unit according to the embodiment.

A conversion circuit 101, which is a feature of the embodiment, includes an input register 102, output register 103, and converter 104. The converter 104 performs conversion processing based on an instruction from the operation panel 1.

Image data input from an input buffer 106 is stored in the input register 102 of the conversion circuit 101, and stored in the output register 103 via the converter 104 based on an instruction from the operation panel 1. A print buffer 107 stores an output from the conversion circuit 101 via the output register 103. A transfer circuit 108 reads out data from the print buffer 107 and transfers it to the printhead 504 to print.

Figure 6:
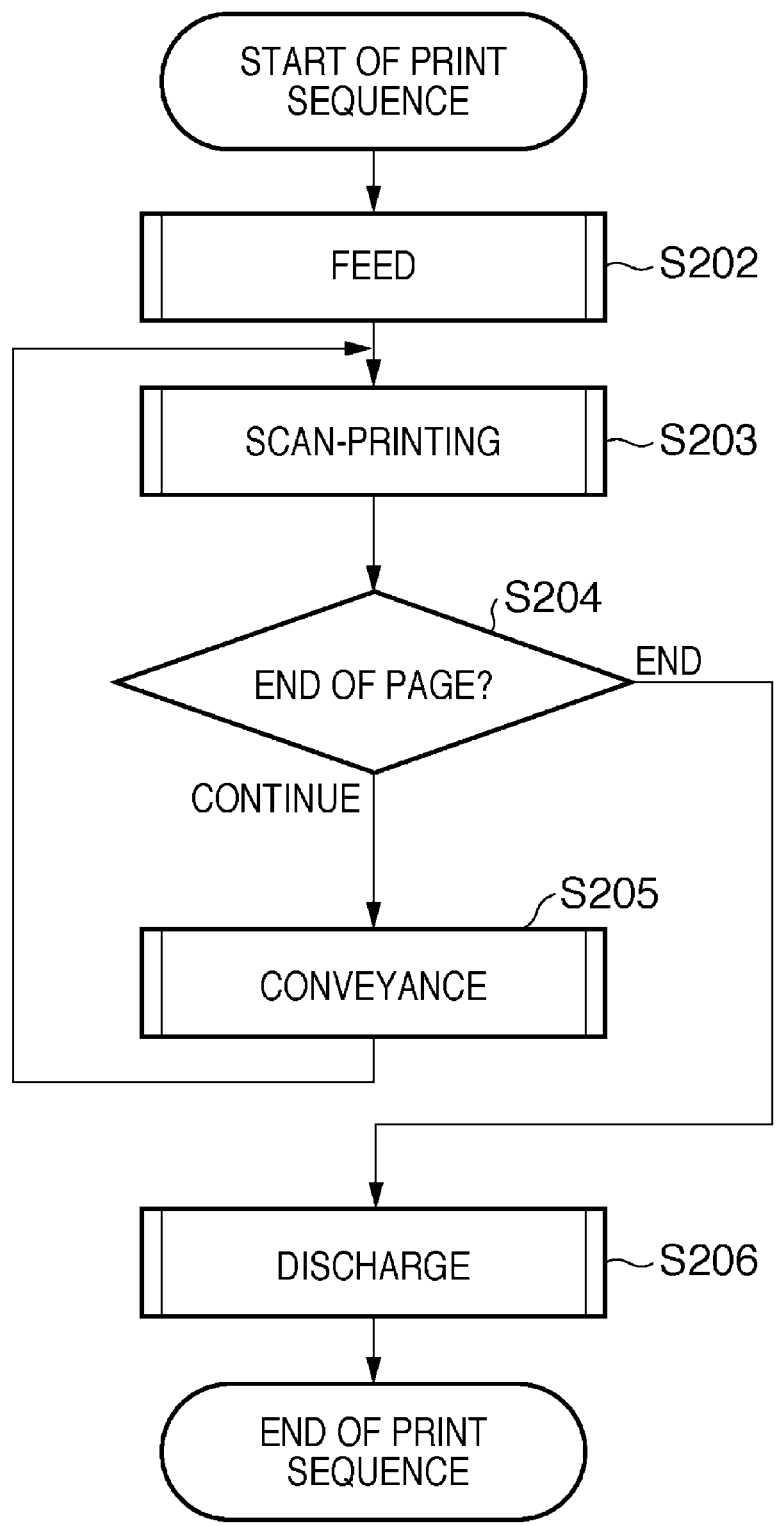
FIG. 6 is a flowchart showing an outline of a sequence to print one page of a printing sheet.

FIG. 6 is a flowchart showing an outline of a sequence to print one page of a printing sheet by the printing unit.

If print data is input, a printing sheet is fed into the printing unit in step S202.

Scan-printing by the printhead 504 in step S203, determination of the end of printing in step S204, and conveyance of a printing sheet in step S205 are executed until the end of printing one page of the printing sheet.

If it is determined in step S204 that printing on the entire printing sheet has ended, the process advances to step S206 to discharge the printing sheet outside the apparatus. Then, the print sequence ends. If it is determined in step S204 to continue printing, the process returns to step S203 to repeat scan-printing and conveyance.

Details of scan-printing in step S203 will be explained.

Figure 7:
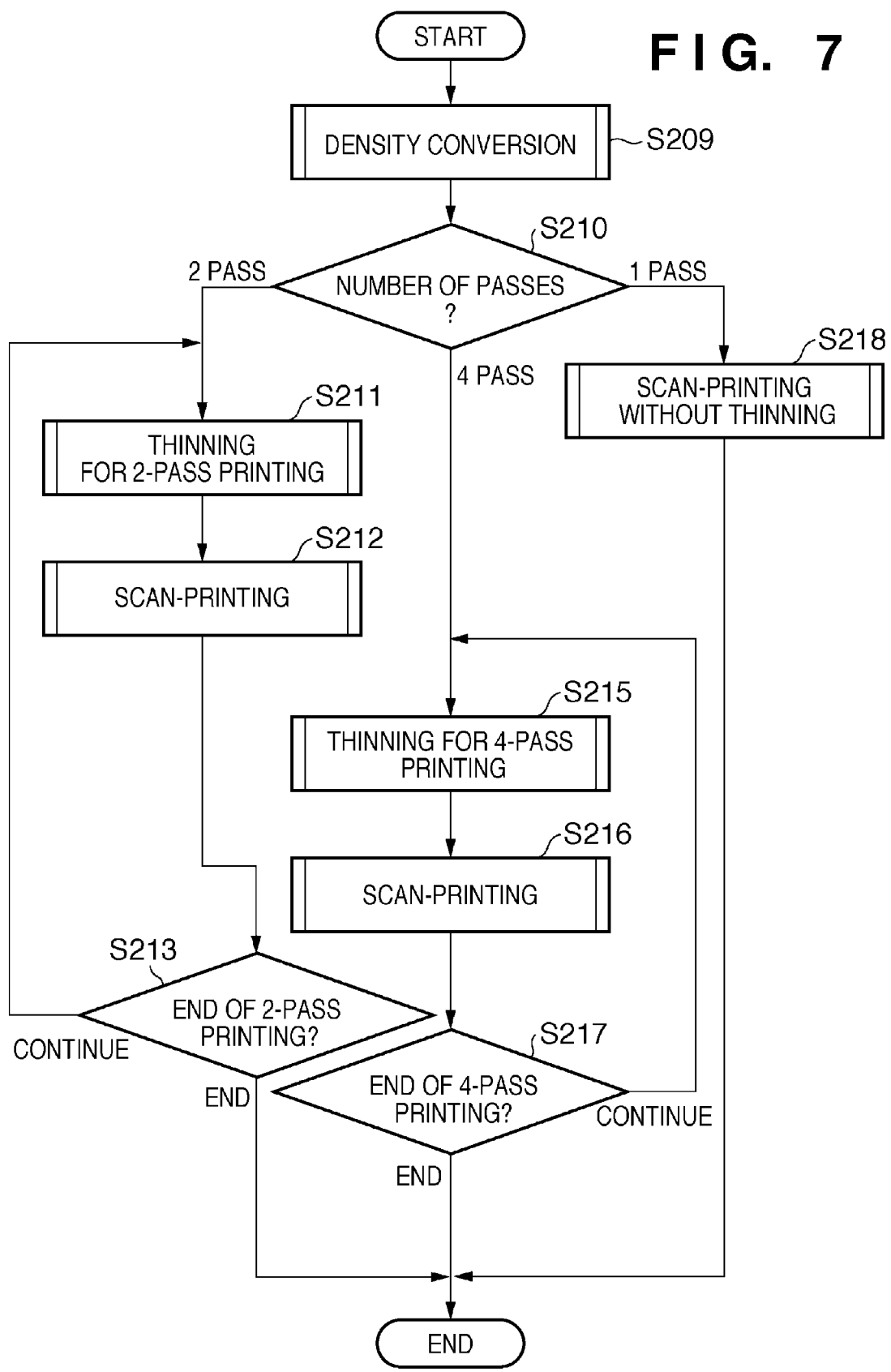
FIG. 7 is a flowchart showing a detailed sequence of scan-printing.

FIG. 7 is a flowchart showing a detailed sequence of scan-printing.

FIG. 7 exemplifies processing when multi-pass printing is possible. In this sequence, scan-printing and conveyance of a printing medium may also be executed alternately.

In step S209, density conversion processing is performed for input data. Details of the density conversion will be described later.

In step S210, the number of scan operations to print by the print width of the printhead 504 is checked. The embodiment will exemplify two passes, four passes, and one pass, but the number of passes is not limited to them.

For example, in 2-pass printing in which the number of passes in multi-pass printing is "2", the process advances to step S211 to thin data for 2-pass printing. In step S212, the printhead 504 is scanned to print on a printing sheet. In step S213, it is determined whether or not 2-pass printing has ended. If it is determined to continue printing, the process returns to step S211. If it is determined that 2-pass printing has ended, the process ends.

In 4-pass printing in which the number of passes in multi-pass printing is "4", the process advances to step S215 to thin data for 4-pass printing. In step S216, the printhead 504 is scanned to print on a printing sheet. In step S217, it is determined whether or not 4-pass printing has ended. If it is determined to continue printing, the process returns to step S215. If it is determined that 4-pass printing has ended, the process ends.

If it is determined in step S210 that the current printing is not multi-pass printing (i.e., 1-pass printing), the process advances to step S218 to simply perform scan-printing using print data without thinning it, unlike multi-pass printing. Then, the process ends.

As is apparent from FIG. 7, density conversion and thinning of print data in multi-pass printing are performed independently in the embodiment.

Details of density conversion processing in step S209 will be explained.

FIG. 8 is a flowchart showing details of density conversion processing (conversion processing). The conversion circuit 101 executes this processing.

In step S302, the conversion circuit 101 determines whether or not image data is multi-valued data. Image data transferred from the image processing unit 6 has a resolution of 300 dpi, and is either multi-valued or binary data.

If the conversion circuit 101 determines that the data is multi-valued one, the process advances to step S303 to read data of one pixel. The input register 102 holds the read data. In step S304, the conversion circuit 101 executes multi-value/binary conversion. The output register 103 holds the converted data. The data held in the output register 103 is output to the print buffer 107.

In this example, multi-valued data is represented by 2 bits per pixel. Hence, the multi-valued data has a quadruple value. Since the printhead has a print resolution of 600 dpi, the quantized value of 300-dpi multi-valued data is accurately represented by four print dots.

FIGS. 9A and 9B are views showing multi-valued data dot bitmapping by multi-value/binary conversion.

Multi-valued data of each pixel is quadruple data (level "0", level "1", level "2", or level "3")). Each pixel has a resolution of 300 dpi, while a print resolution is 600 dpi.

When the quantized value of multi-valued data is "3" (level "3"), input data is converted (bitmapped) into binary data of a dot layout 901 in grids at the 600-dpi print resolution, as shown in FIG. 9A. When the quantized value of multi-valued data is "1" (level "1"), input data is converted (bitmapped) into binary data of a dot layout 902 in grids at the 600-dpi print resolution, as shown in FIG. 9B. In this way, the dots of multi-valued data are bitmapped based on the input value (input level) and a predefined dot pattern rule of a 2×2 dot matrix.

After the conversion processing, in step S305, the conversion circuit 101 determines whether or not predetermined data processing has ended. If the conversion circuit 101 determines that the predetermined data processing has not ended, the process returns to step S302. If determination of multi-valued or binary data can be omitted depending on a data format specification to be processed, step S302 may be omitted to continue the process from step S303. If the conversion circuit 101 determines that the predetermined data processing has ended, the process ends.

If the conversion circuit 101 determines in step S302 that the data is binary, the process advances to step S307 to read binary data of two pixels. The data of two pixels are assumed to be successive in the scanning direction of the printhead 504.

Note that data of two pixels are read in the embodiment, but the number of pixels to be read is not limited to two. For example, in an arrangement which inputs multi-valued data of four pixels, binary data of eight pixels may be input.

Subsequently, the process advances to step S308 to check the thinning rate based on the contents of a thinning instruction in the ink saving mode that is an instruction input from the operation panel 1. If the conversion circuit 101 determines that the thinning rate is 25%, the process advances to step S309 to perform 25% dot bitmapping. If the conversion circuit 101 determines that the thinning rate is 50%, the process advances to step S310 to perform 50% dot bitmapping. If the conversion circuit 101 determines that the thinning rate is 75%, the process advances to step S311 to perform 75% dot bitmapping. If the conversion circuit 101 determines that the thinning rate is 100%, the process advances to step S312 to perform 100% dot bitmapping.

After executing dot bitmapping in one of steps S309 to S312, the process advances to step S305 to make the foregoing determination. As described above, if determination of multi-valued or binary data can be omitted depending on a data format specification to be processed, step S302 may be omitted to continue the process from step S307.

FIGS. 10A to 10D are views for explaining binary data conversion processing accompanied by resolution conversion.

Resolution conversion accompanied by thinning processing for read binary data of two pixels will be described. As shown in FIGS. 10A to 10D, the conversion processing converts two pixels 401 at a resolution of 300 dpi into dots of eight pixels at a resolution of 600 dpi. In this fashion, 300-dpi binary data are converted into 600-dpi binary data.

Figure 10A:
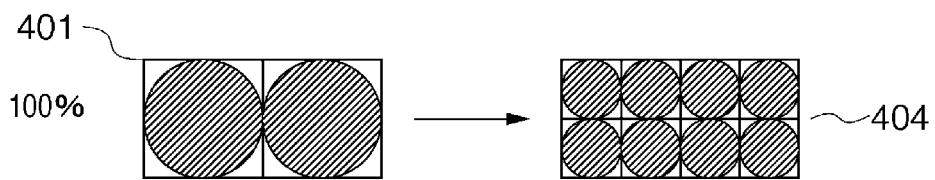
FIGS. 10A, 10B, 10C, and 10D are views for explaining binary data conversion processing accompanied by resolution conversion.

FIG. 10A shows 100% dot bitmapping without thinning. In this case, 300-dpi binary data are converted to have a dot pattern of dots 404. When the binary data value is "1", all the four corresponding dots of a 600-dpi 2×2 dot matrix are bitmapped into "1" (shaded circles in FIG. 10A). In other words, no mask processing is executed.

Figure 10B:
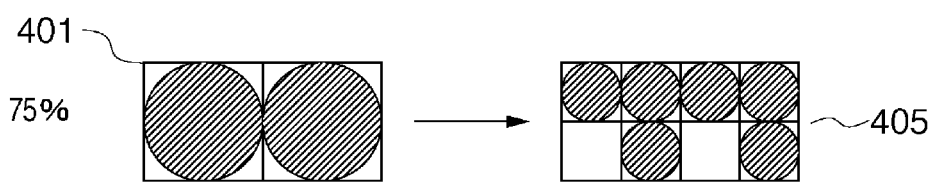

FIG. 10B shows 75% dot bitmapping. In this case, 300-dpi binary data are converted to have a dot pattern of dots 405. When the binary data value is "1", three corresponding dots of a 600-dpi 2×2 dot matrix are bitmapped into "1" (shaded circles in FIG. 10B). In other words, 25% of dots are thinned (masked) to control the density of an image to be printed on a printing medium.

Figure 10C:
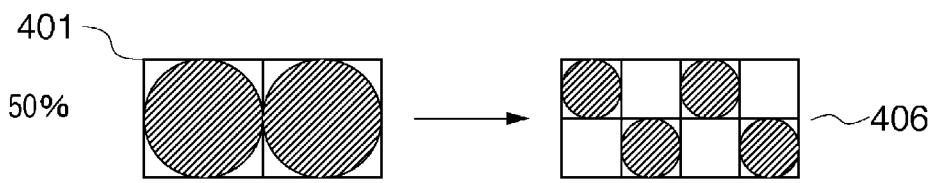

FIG. 10C shows 50% dot bitmapping. In this case, 300-dpi binary data are converted to have a dot pattern of dots 406. When the binary data value is "1", two corresponding dots of a 600-dpi 2×2 dot matrix are bitmapped into "1" (shaded circles in FIG. 10C). In other words, 50% of dots are thinned (masked) to control the density of an image to be printed on a printing medium.

Figure 10D:
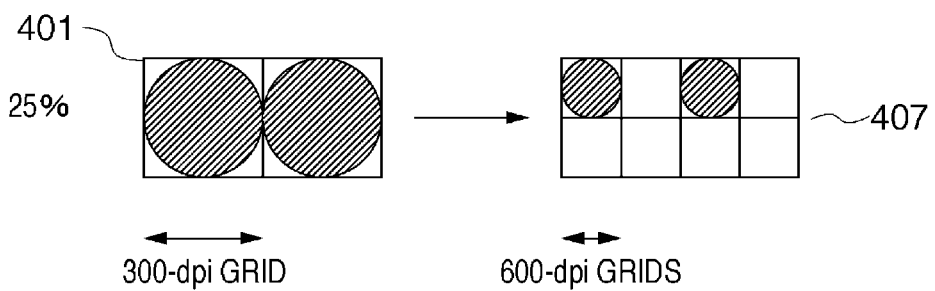

FIG. 10D shows 25% dot bitmapping. In this case, 300-dpi binary data are converted to have a dot pattern of dots 407. When the binary data value is "1", one corresponding dot of a 600-dpi 2×2 dot matrix is bitmapped into "1" (shaded circles in FIG. 10D). In other words, 75% of dots are thinned (masked) to control the density of an image to be printed on a printing medium.

A comparison between FIGS. 9A and 9B and FIGS. 10A to 10D reveals that a 600-dpi 2×2 dot matrix used in multi-value/binary conversion and a 600-dpi 2×2 dot matrix used in resolution conversion and thinning processing of binary data can share a dot pattern. More specifically, the dot pattern of a dot matrix for a quantized value "3" is identical to that for 75% dot bitmapping. The dot pattern of a dot matrix for a quantized value "2" is identical to that for 50% dot bitmapping. The dot pattern of a dot matrix for a quantized value "1" is identical to that for 25% dot bitmapping.

In this manner, the embodiment applies a common dot pattern to multi-value/binary conversion (first processing) of multi-valued data, and resolution conversion and thinning processing (second processing) of binary data. The thinning processing selectively uses one of dot patterns in accordance with a designated thinning rate. Common dot pattern processing can reduce the circuit scale of the ASIC and the dot pattern storage capacity, compared to exclusively using a dot pattern. Execution of the first and second processes is controlled in accordance with an instruction from the operation panel 1.

Figure 11A:
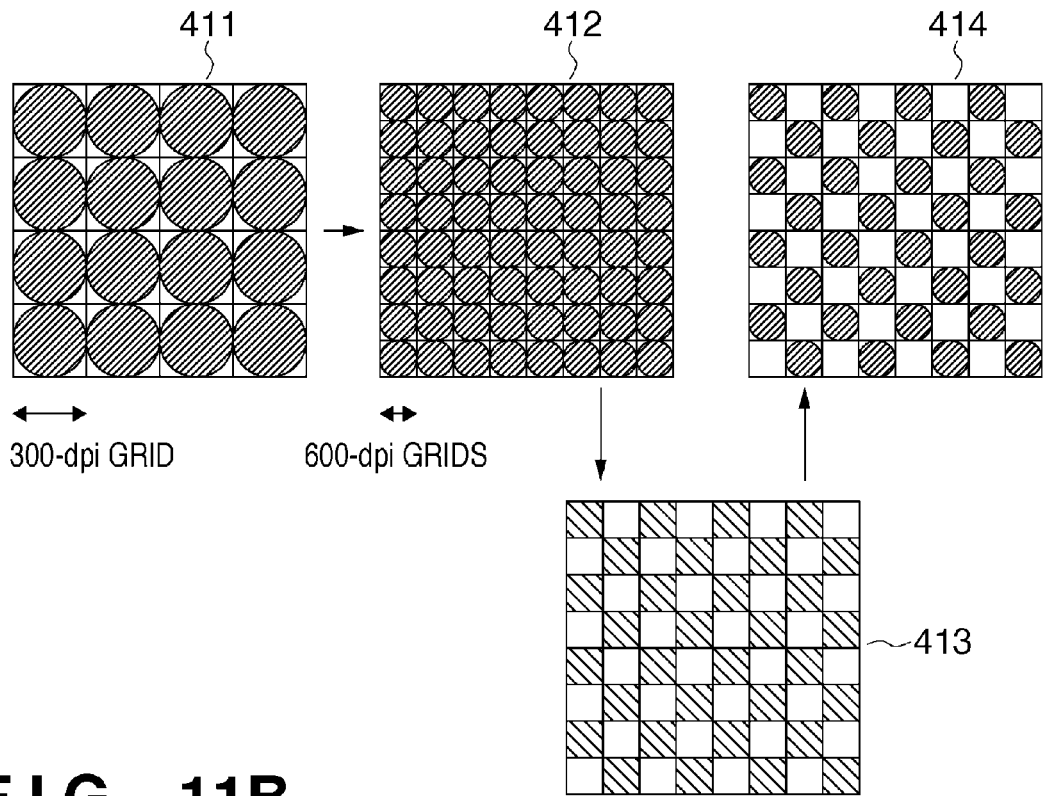
FIGS. 11A and 11B are views for explaining mask processing using a conventional checkered pattern and mask processing according to the embodiment.
Figure 11B:
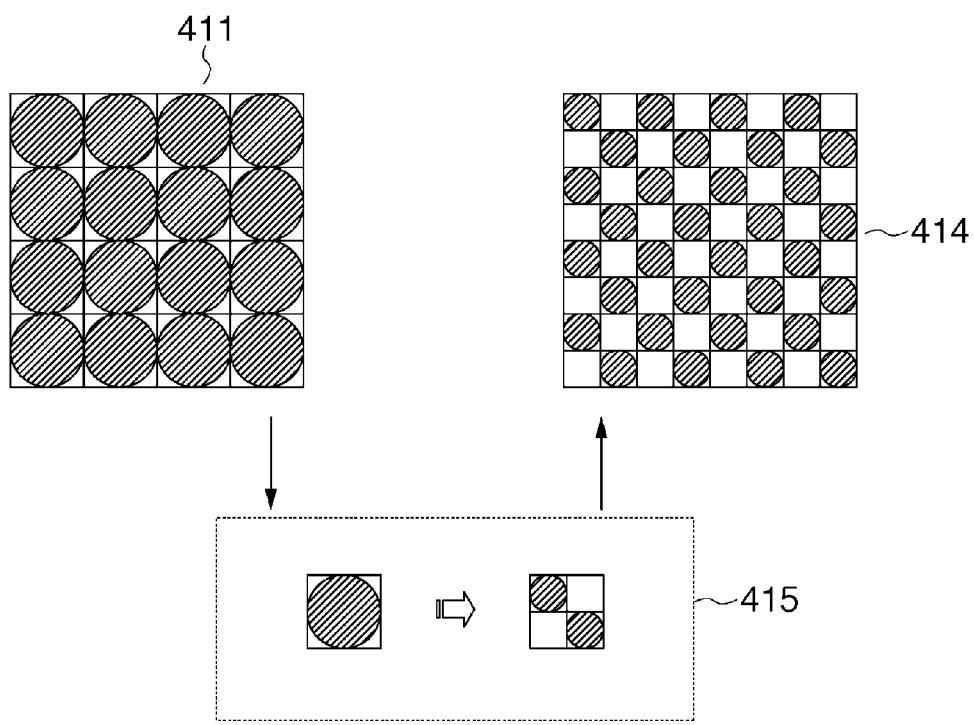

FIGS. 11A and 11B are views for explaining mask processing using a conventional checkered pattern and mask processing in the embodiment.

FIG. 11A shows mask processing using a conventional checkered pattern. FIG. 11B shows thinning processing in the embodiment. In both FIGS. 11A and 11B, input data is 300-dpi binary data. The 300-dpi binary data is converted into 600-dpi binary data to perform 50% mask processing.

According to the conventional method, a dot pattern 411 represented by 300-dpi input binary data is converted into a 600-dpi dot pattern 412, doubling the number of dots in both the longitudinal and lateral directions, as shown in FIG. 11A. In a print operation, a thinning mask 413 is applied to the dot pattern 412 to print. As a result, dots printed on a printing sheet form a thinned dot pattern 414.

To the contrary, according to the embodiment, the dot pattern 411 represented by 300-dpi input binary data undergoes resolution conversion processing 415 as shown in FIG. 10C to perform dot bitmapping, as shown in FIG. 11B. Dots printed on a printing sheet form a dot pattern 414 thinned by 50%.

The embodiment performs resolution conversion and mask (thinning) processing together, and can omit a thinning mask, which is necessary in the conventional method. The embodiment can therefore omit a storage capacity to store a mask pattern, a circuit for mask processing, and the like, which are required in the conventional method. Since resolution conversion and mask processing can be executed independently of subsequent processing, a pass division mask and the like for multipass printing can be easily implemented.

The above-described density conversion processing reads multi-valued data of one pixel and binary data of two pixels, but the present invention is not limited to this. For example, multi-valued data in which 2 bits represent one pixel and binary data in which 1 bit represents one pixel may be read by the same number of pixels, for example, one pixel each.

Even for data of the same resolution, multi-valued data is represented by 2 bits per pixel, and binary data is represented by 1 bit per pixel. For 300-dpi binary data, 1-bit data is converted into 2-bit data. For example, a binary data value "0" is converted into "00", and a binary data value "1" is converted into "11". In this manner, 300-dpi binary data converted into pseudo 2-bit data is converted into 600-dpi binary data, similar to multi-valued data. Similarly, when multi-valued data is represented by 4 bits per pixel and binary data is represented by 1 bit per pixel, a binary data value "0" is converted into "0000", and a binary data value "1" is converted into "1111".

The embodiment adopts an arrangement which converts 300-dpi data into 600-dpi data, but the resolution may take another value. The print resolution may be 1,200 dpi for each of cyan, magenta, and yellow and 600 dpi for black. In this case, the conversion circuit receives 600-dpi data of each of cyan, magenta, and yellow, and converts it into 1200-dpi data. The conversion circuit receives 300-dpi data of black and converts it into 600-dpi data. Note that the image processing unit 6 generates binary or multi-valued data based on whether the image is a text or natural image, but may employ another arrangement. For example, the image processing unit 6 generates binary data when the operation mode of the multi-function printer is the ink saving mode, and multi-valued data when it is not the ink saving mode.

The embodiment can achieve higher-density, higher-resolution printing using one of inkjet printing methods that adopts a means (e.g., electrothermal transducer) for generating heat energy to discharge ink and changes the ink state by the heat energy.

In addition, the inkjet printing apparatus according to the present invention is used as an image output apparatus for an information processing apparatus such as a computer. The inkjet printing apparatus may also take the form of a copying machine combined with a reader, or a facsimile apparatus having a transmission/reception function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-172647, filed Jul. 1, 2008, which is hereby incorporated by reference herein in its entirety.

What is claimed is:

1. A printing apparatus comprising:
instruction means for inputting an instruction from a user;
data processing means for executing a first processing to convert multi-valued image data into binary image data and a second processing to perform resolution conversion and thinning processing of binary image data by using a dot pattern;
control means for controlling to execute either of the first processing and the second processing in accordance with the instruction from said instruction means; and
printing means for printing an image on a printing medium based on data obtained by executing said data processing means,
wherein said data processing means uses a common dot pattern for executing the first processing and the second processing.

2. The apparatus according to claim 1, wherein
the first processing includes processing to convert the multi-valued image data in which a plurality of bits represent one pixel into a dot pattern represented by a dot matrix formed from a plurality of bits, and
the resolution conversion in the second processing includes processing to convert a resolution of the binary image data into a print resolution of said printing means.

3. The apparatus according to claim 2, wherein the thinning processing in the second processing performs thinning using the dot pattern represented by the dot matrix for the binary image data having undergone the resolution conversion.

4. The apparatus according to claim 3, wherein
said instruction means inputs a thinning rate for the thinning processing, and
the thinning processing in the second processing selects one of a plurality of dot patterns in accordance with the thinning rate.

5. The apparatus according to claim 1, wherein said printing means includes a printhead.

* * * * *